United States Patent
Huang

(10) Patent No.: US 7,418,243 B2
(45) Date of Patent: Aug. 26, 2008

(54) VERY SMALL APERTURE TERMINAL WITH DUAL-INPUT DC POWER CONTROL

(75) Inventor: Chuang-Chia Huang, Taipei Hsien (TW)

(73) Assignee: Wistron Neweb Corp., Taipei Hsien (TW)

( * ) Notice: Subject to any disclaimer, the term of this patent is extended or adjusted under 35 U.S.C. 154(b) by 877 days.

(21) Appl. No.: 10/847,176

(22) Filed: May 17, 2004

(65) Prior Publication Data

US 2005/0176389 A1    Aug. 11, 2005

(30) Foreign Application Priority Data

Feb. 5, 2004    (TW) .............................. 93102591 A

(51) Int. Cl.
*H04B 1/04*    (2006.01)

(52) U.S. Cl. ..................................... 455/127.1; 327/548

(58) Field of Classification Search ............. 455/127.1; 327/548

See application file for complete search history.

(56) References Cited

U.S. PATENT DOCUMENTS

| | | | | |
|---|---|---|---|---|
| 5,717,319 A * | 2/1998 | Jokinen | ....................... | 323/280 |
| 6,858,991 B2 * | 2/2005 | Miyazawa | ................ | 315/169.3 |
| 7,026,797 B2 * | 4/2006 | McCune, Jr. | ................ | 323/225 |
| 7,058,374 B2 * | 6/2006 | Levesque et al. | ......... | 455/127.3 |
| 7,207,054 B1 * | 4/2007 | Richards et al. | ................ | 725/72 |
| 2003/0210021 A1 * | 11/2003 | Silic | ........................... | 323/282 |
| 2004/0242170 A1 * | 12/2004 | Gilbert | .................... | 455/127.1 |

* cited by examiner

*Primary Examiner*—Edward Urban
*Assistant Examiner*—Adeel Haroon
(74) *Attorney, Agent, or Firm*—Thomas, Kayden, Horstemeyer & Risley

(57) ABSTRACT

The present invention relates to a satellite signal transmitter, and in particular, to a satellite signal transmitter with a dual-input DC power control switch.

10 Claims, 3 Drawing Sheets

VERY SMALL APERTURE TERMINAL WITH DUAL-INPUT DC POWER CONTROL

BACKGROUND OF THE INVENTION

1. Field of the Invention

The present invention relates to a very small aperture terminal (VSAT), and in particular, to a VSAT with a dual-input DC power control.

2. Description of the Related Art

A VSAT satellite communicator transmits and receives signals through a mini-antenna, transferring video and audio information through high bandwidth connections provided within range of the satellite signal. Currently satellite networking services are highly developed so that various application services are popular. Portable satellite communication devices are widely used, with the result that low power consumption is a priority.

Although signal transfer systems in electronic circuits are minimized, considerable power is required to enable radio transmission. Thus a power amplifier provides amplification necessary for the minimized circuits to provide radio waves of sufficient power.

The power amplifier magnifies an input signal for output, such that power used is often several times larger than that in electronic circuits. Thus, reducing power consumption of the power amplifier and control thereof by a power switch, is desirable.

A low noise high frequency signal source is used in uplink design, whereby a phase lock loop oscillator (PLO) stabilizes an inaccurately operating high-frequency signal. In comparison to a frequency multiplier, PLO has lower cost and higher performance.

In addition, a mechanism for controlling VSAT operations is required.

SUMMARY OF THE INVENTION

An object of the present invention is to provide a VSAT satellite signal transmitter. The transmitter comprises a phase lock oscillator, a power supply, a power amplifier, and a switch. The phase lock oscillator provides an oscillating signal and a locking potential. The power supply provides a direct current and a first power potential. The power amplifier, driven by the direct current, amplifies the oscillating signal. The switch, coupled between the power supply and the power amplifier, conducts the direct current according to the locking potential and the first power potential.

The direct current is not conducted when the first power potential is at a first level of 0 volts or when the locking potential is at a fourth level of 0 volts. The direct current is only conducted when the first power potential is at a second level of −5 volts, and the locking potential is at a third level of 5 volts.

The switch further comprises an input node, an output node, a locking node and a first power node. The input node, coupled to the power supply, conducts the direct current. The output node, coupled to the power amplifier, conducts the direct current. The locking node, coupled to the phase lock oscillator, conducts the locking potential. The first power node, coupled to the power supply, conducts the first power potential.

Another object of the present invention is to provide a switch circuit for controlling power. The switch circuit comprises a first transistor and a second transistor. The first transistor, coupled to a power supply, provides a direct current to a power amplifier. The second transistor, coupled to the first transistor, controls the conductance of the first transistor according to a first input potential and a second input potential.

The first transistor is a P-channel metal-oxide semiconductor field effect transistor, comprising a source node, a drain node, and a gate node. The source node is coupled to the direct current. The drain node is coupled to the power amplifier, and the gate node is coupled to the source node through a resistor.

The second transistor is a NPN bipolar transistor, comprising a collector node, an emitter node and a base node. The collector node is coupled to a gate node of the first transistor. The base node is coupled to a first input node corresponding to the first input potential, and the emitter node is coupled to a second input node corresponding to the second input potential, and also coupled to a source node of the first transistor through a resistor.

When the second transistor is on, the first transistor is on, and the direct current is conducted from the power supply to the power amplifier through the first transistor.

The first transistor is a P-channel metal-oxide semiconductor field effect transistor and the second transistor is an N-channel field effect transistor or a NPN bipolar transistor.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

A detailed description of the present invention is provided in the following.

Figure 1:
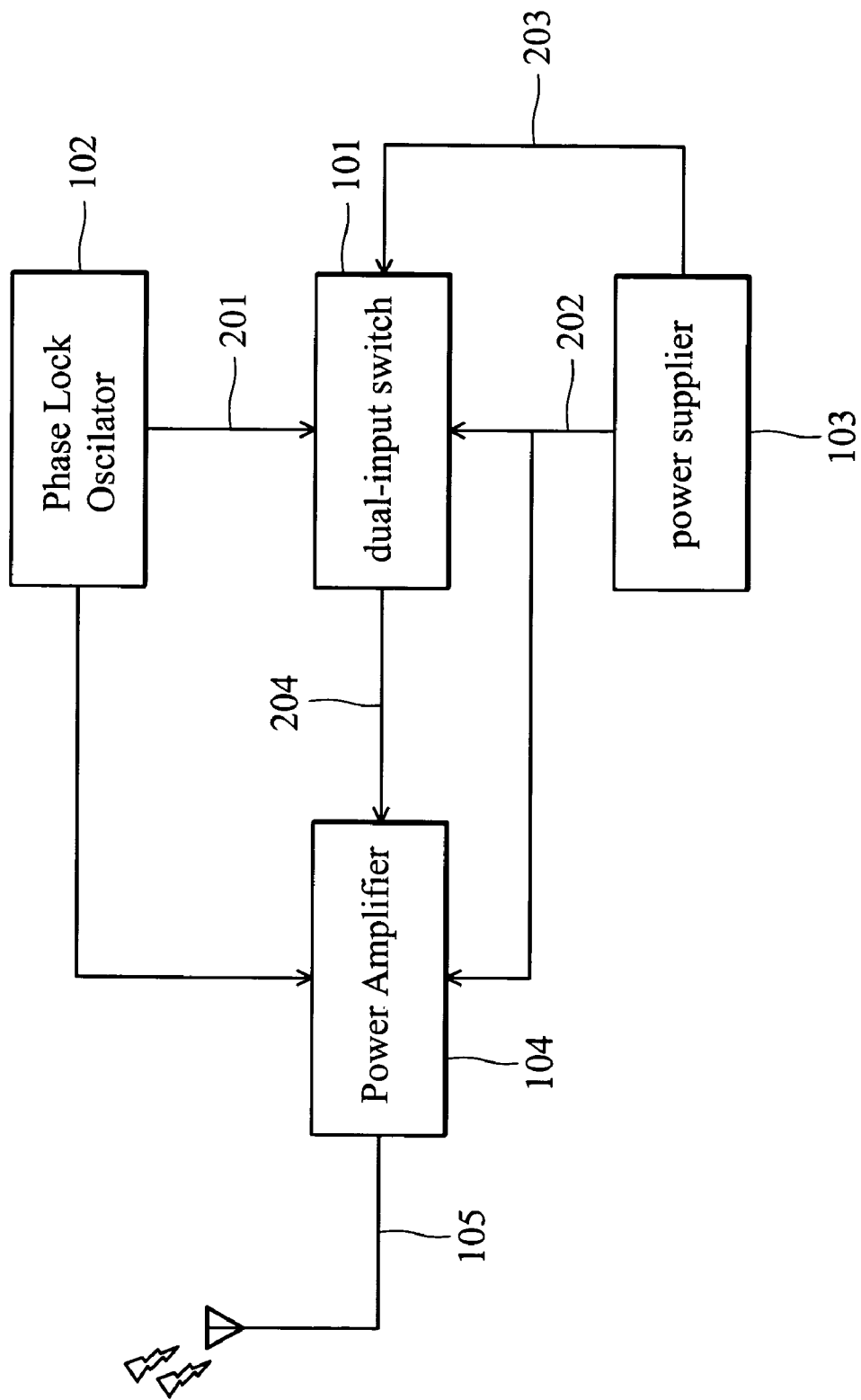
FIG. 1 is a block diagram of the VSAT with the switch according to the present invention.

FIG. 1 shows an embodiment of the dual-input switch 101, for controlling conductance of the circuit according the present invention. A stable high frequency signal is generated from an unstable low frequency signal by a PLO 102, and input to a power amplifier 104 for VSAT communication. In the power amplifier 104, a protection circuit driven by negative power supplied by the power supply 103 is provided. Additionally, the power supply 103 simultaneously provides a first power potential for the switch 101 through a first power node 202. The switch 101 is connected to the power supply 103 through an input node 203, and is connected to the power amplifier 104 through an output node 204. The status of the PLO 102 and power supply 103 determine the conductance of the input node 203 and the output node 204. The PLO 102 comprises a locking node 201. The power supply 103 comprises a first power node 202 providing negative power. When the locking node 201 is at high potential and the first power node 202 is at low potential, the switch 101 turns on and the input node 203 is conducted to the output node 204, enabling the power amplifier 104 to transmit radio waves.

When the PLO 102 operates normally, the voltage of the locking node 201 on the PLO 102 is at high potential, and the state of the switch 101 is on, a current is conducted from the input node 203 to the power amplifier 104 through the output node 204. The PLO 102 may cease to operate under some extreme conditions, such as when temperature or humidity thresholds are exceeded or the physical devices are damaged.

As well, the PLO 102 may be turned off by a shutdown command. When PLO 102 is shut down, the potential of locking node 201 is low, and the switch 101 is switched to the off state. When the switch 101 is in the off state, no power is consumed by the PLO 102, but a negative power supplied from the power supply 103 is still consumed by the protection circuit of the power amplifier 104.

Figures 2, 3:
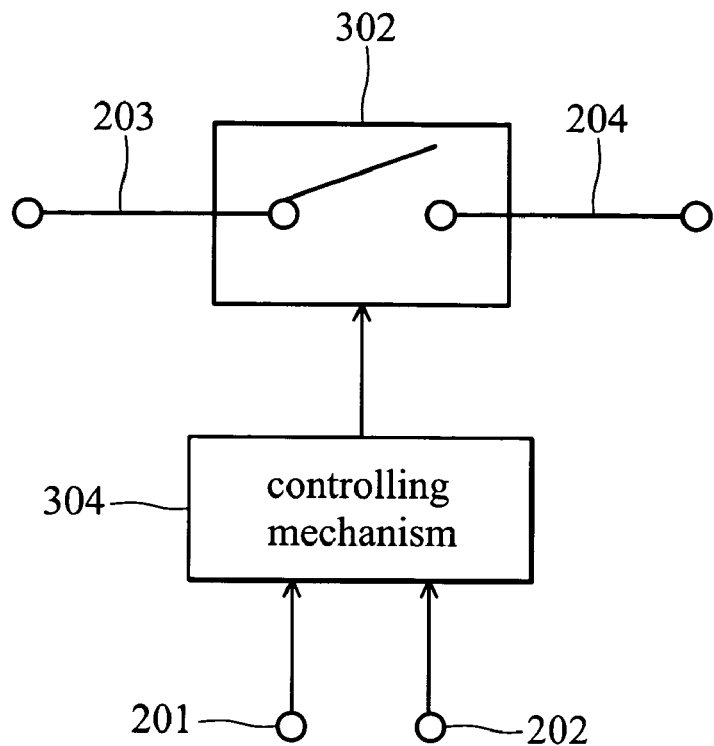
FIG. 2 is a block diagram of the switch according to the present invention.
FIG. 3 is a truth table for FIG. 2.

FIG. 2 shows a block diagram of the switch 101 according to the present invention. The diagram is divided into a switch 302 and a controller 304, wherein the controller 304 has two input nodes, the locking node 201 and the first power node 202, for determining whether the switch 302 is on or off.

FIG. 3 shows a truth table for the switch 101 which is only turned on when the first power node 202 is at low potential and the locking node 201 is at high potential. Otherwise the switch is turned off. Thus a simple truth table is given below:

| First power node 202 | Locking node 201 | Switch 101 |
|---|---|---|
| −5 volts | 5 volts | On |
| −5 volts | 0 volts | Off |
| 0 volts | Any | Off |

Figure 4:
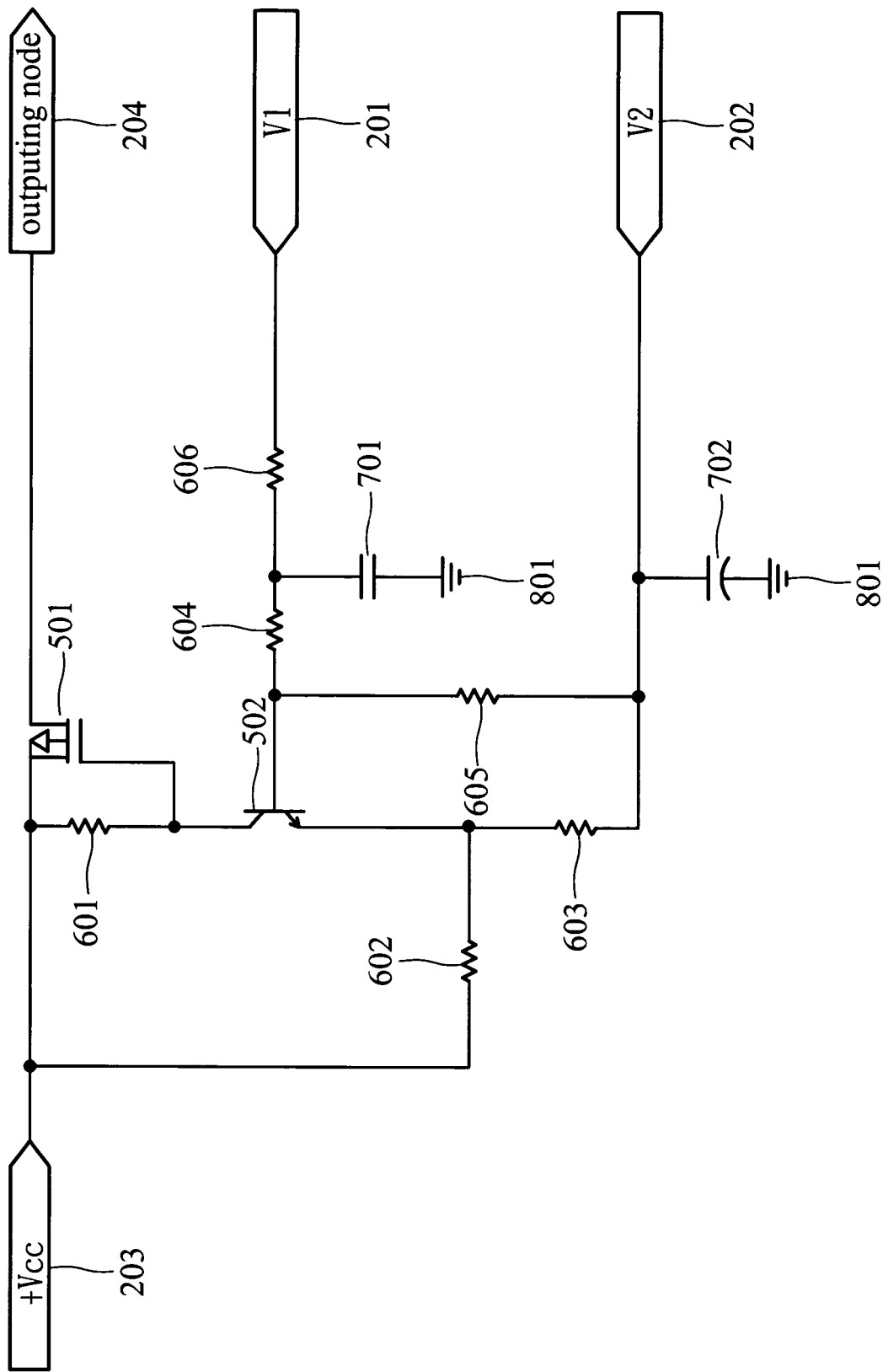
FIG. 4 is a detailed circuit diagram according to the present invention.

In another embodiment of the present invention shown in FIG. 4, the switch 101 comprises two transistors. One transistor is a P-channel metal-oxide semiconductor field effect transistor 501, and the other is a NPN bipolar transistor 502. A current is conducted from input node 203 to output node 204 through P-channel metal-oxide semiconductor field effect transistor 501 under control of the potentials at locking node 201 and first power node 202.

In the P-channel metal-oxide semiconductor field effect transistor 501, a source node is connected to power supply 103 via input node 203 and a drain node is connected to power amplifier 104 via output node 204. A gate node is also coupled to the source node through a resistor Rc 601.

A base node is coupled to the PLO 102 and an emitter node is coupled to power supply 103 inside the NPN bipolar transistor 502. A collector is also coupled to the gate node of the P-channel metal-oxide semiconductor field effect transistor 501, and the emitter is also coupled to the source node of the P-channel metal-oxide semiconductor field effect transistor 501 through a resistor Rel 602.

The P-channel metal-oxide semiconductor field effect transistor 501 is turned on when the locking node 201 is at high potential and the first node 202 is at low potential. Otherwise the P-channel metal-oxide semiconductor field effect transistor 501 is turned off. The response time of the switch 101 is under two milliseconds, and as such is a relatively fast implementation.

The detailed specifications of the P-channel metal-oxide semiconductor field effect transistor 501 maybe further defined to meet actual requirements, such as quantity of the output current, or voltage of the input node 201. Rc 601 and Ri 606 are used for current limiting, and C1 701 and C2 702 can be omitted if considerations of signal vibration or switch timing are omitted.

Ri1 604, Ri2 605, Re1 602 and Re2 603 tune the voltage threshold of the locking node 201 and the first power node 202, and are partially or totally omitted under some limited circumstances.

As shown is FIG. 1 and FIG. 4, the first power node 202 is at −5 volts and the locking node is at 5 volts while the switch is on.

In an embodiment of the present invention, the NPN bipolar transistor 502 can be substituted with an N-channel field effect transistor.

In another embodiment of the invention, the protection circuit of the power amplifier 104 may be driven by positive power rather than negative power, and the switch 101 conducts a negative power. The embodiments, however, are not limited by the use of positive or negative power.

Thus, the present invention ameliorates the disadvantages of the conventional power switch by providing a switch for a VSAT capable of controlling one power switch with two input nodes. The invention by means of two simple transistors, offers a low cost, high performance electronic power switch. Additionally the power switch of the invention requires less power to operate than the conventional power switch and enables fast switching for a VSAT.

While the invention has been described by way of example and in terms of the embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication apparatus, comprising:
    a phase lock oscillator, for providing an oscillating signal, and a first input potential;
    a power supply, for providing a direct current, and a second input potential;
    a power amplifier, driven by the direct current to amplify the oscillating signal; and
    a switch, comprising:
        a first transistor, coupled to the power supply, for conducting the direct current to the power amplifier;
        a second transistor, coupled to the first transistor, for controlling the conductance of the first transistor according to the first input potential and the second input potential.

2. The communication apparatus as claimed in claim 1, wherein:
    the first transistor is a P-channel metal-oxide semiconductor field effect transistor, comprising:
        a source node, coupled to the direct current;
        a drain node, coupled to the power amplifier; and
        a gate node, coupled to the source node through a resistor.

3. The communication apparatus as claimed in claim 2, wherein the second transistor is a NPN bipolar transistor, comprising:
    a collector node, coupled to a gate node of the first transistor;
    a base node, coupled to a first input node corresponding to the first input potential; and
    an emitter node, coupled to a second input node corresponding to the second input potential, and coupled to a source node of the first transistor through a resistor.

4. The communication apparatus as claimed in claim 1, wherein the direct current is not conducted when the second input potential is at a first level.

5. The communication apparatus as claimed in claim 4, wherein the first level is 0 volts.

6. The communication apparatus as claimed in claim 1, wherein the direct current is not conducted when the first input potential is at a fourth level.

7. The communication apparatus as claimed in claim 6, wherein the fourth level is 0 volts.

8. The communication apparatus as claimed in claim 1, wherein the direct current is conducted when the second input potential is at a second level, and the first input potential is at a third level.

9. A switch circuit for controlling power, comprising:
a first transistor, coupled to a power supply, for conducting a direct current to a power amplifier;
a second transistor, coupled to the first transistor, for controlling the conductance of the first transistor according to a first input potential and a second input potential;
wherein the first transistor is a P-channel metal-oxide semiconductor field effect transistor, comprising:
a source node, coupled to the direct current;
a drain node, coupled to the power amplifier; and
a gate node, coupled to the source node through a resistor.

10. A switch circuit for controlling power, comprising:
a first transistor, coupled to a power supply, for conducting a direct current to a power amplifier;
a second transistor, coupled to the first transistor, for controlling the conductance of the first transistor according to a first input potential and a second input potential;
wherein the second transistor is a NPN bipolar transistor, comprising:
a collector node, coupled to a gate node of the first transistor;
a base node, coupled to a first input node corresponding to the first input potential; and
an emitter node, coupled to a second input node corresponding to the second input potential, and coupled to a source node of the first transistor through a resistor.

* * * * *